(12) United States Patent
Lau et al.

(10) Patent No.: US 8,732,666 B2
(45) Date of Patent: *May 20, 2014

(54) AUTOMATIC IDENTIFICATION OF SUBROUTINES FROM TEST SCRIPTS

(75) Inventors: Tessa A. Lau, Mountain View, CA (US); Jalal U. Mahmud, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 76 days.

This patent is subject to a terminal disclaimer.

(21) Appl. No.: 13/592,055

(22) Filed: Aug. 22, 2012

(65) Prior Publication Data

US 2012/0317547 A1     Dec. 13, 2012

Related U.S. Application Data

(63) Continuation of application No. 12/769,033, filed on Apr. 28, 2010, now Pat. No. 8,490,056.

(51) Int. Cl.
*G06F 9/44* (2006.01)
*G06F 9/45* (2006.01)

(52) U.S. Cl.
USPC ............................ 717/124; 717/142; 717/143

(58) Field of Classification Search
None
See application file for complete search history.

(56) References Cited

U.S. PATENT DOCUMENTS

| | | | | |
|---|---|---|---|---|
| 5,291,286 | A * | 3/1994 | Murakami et al. | 348/469 |
| 5,293,629 | A * | 3/1994 | Conley et al. | 717/142 |
| 5,870,729 | A * | 2/1999 | Yoda | 706/26 |
| 5,943,674 | A * | 8/1999 | Schofield | 717/143 |
| 5,974,412 | A * | 10/1999 | Hazlehurst et al. | 1/1 |
| 6,185,576 | B1 * | 2/2001 | McIntosh | 1/1 |
| 6,269,474 | B1 * | 7/2001 | Price | 717/142 |
| 6,425,120 | B1 * | 7/2002 | Morganelli et al. | 717/143 |
| 6,449,591 | B1 * | 9/2002 | Kondo et al. | 704/222 |
| 6,523,171 | B1 * | 2/2003 | Dupuy et al. | 717/142 |
| 6,654,953 | B1 * | 11/2003 | Beaumont et al. | 717/142 |
| 6,704,905 | B2 * | 3/2004 | Fukushige et al. | 715/234 |
| 7,328,430 | B2 * | 2/2008 | Fairweather | 717/142 |
| 7,346,595 | B2 * | 3/2008 | Aoyama et al. | 706/25 |
| 7,346,621 | B2 * | 3/2008 | Zhang et al. | 707/802 |
| 7,349,895 | B2 * | 3/2008 | Liu et al. | 1/1 |
| 7,415,635 | B1 * | 8/2008 | Annangi | 717/124 |

(Continued)

OTHER PUBLICATIONS

Baeza-Yates, Ribeiro-Neto, "Modern Information Retrieval"; 1999 ACM Press; [retrieved on Apr. 16, 2013]; Retrieved from Internet <URL:ftp://mail.imtku.edu/tw/seke/slide/baeza-yates/chap10_user_interfaces_and_visualization-modern_ir.pdf>;pp. 1-340.*

(Continued)

*Primary Examiner* — Thuy Dao
*Assistant Examiner* — Xi D Chen
(74) *Attorney, Agent, or Firm* — Shimokaji & Associates, P.C.

(57) ABSTRACT

A method for automatic identification of subroutines from test scripts is disclosed. An instruction class may be coded as a subroutine vector in a vector space model. A test script action may be coded as a test script vector in a vector space model. The test script vector may be compared to the subroutine vector. The test script vector may be identified and labeled. The test script vector may be labeled as a new test script action if the result of comparing is below a threshold value. An identifier may be associated with a new test script action.

5 Claims, 19 Drawing Sheets

(56) References Cited

U.S. PATENT DOCUMENTS

| | | | |
|---|---|---|---|
| 7,464,060 B2 * | 12/2008 | Suyama et al. | 706/12 |
| 7,487,151 B2 * | 2/2009 | Yamamoto | 1/1 |
| 7,668,789 B1 * | 2/2010 | Forman et al. | 706/20 |
| 7,693,683 B2 * | 4/2010 | Ihara | 702/179 |
| 7,747,984 B2 * | 6/2010 | Hsu | 717/124 |
| 8,087,001 B2 * | 12/2011 | Hoyek et al. | 717/124 |
| 8,151,276 B2 * | 4/2012 | Grechanik et al. | 717/124 |
| 8,195,734 B1 * | 6/2012 | Long et al. | 708/520 |
| 8,276,130 B2 * | 9/2012 | Wang et al. | 717/143 |
| 8,365,147 B2 * | 1/2013 | Grechanik et al. | 717/124 |
| 8,464,232 B2 * | 6/2013 | Urakhchin | 717/143 |
| 2005/0075875 A1 * | 4/2005 | Shozakai et al. | 704/231 |
| 2006/0184471 A1 * | 8/2006 | Minamino et al. | 706/16 |
| 2009/0049431 A1 * | 2/2009 | Wang et al. | 717/143 |

OTHER PUBLICATIONS

Yang, Liu, "A re-examination of text categorization methods"; 1999 ACM; [retrieved on Apr. 16, 2013]; Retrieved from Internet <URL:http://dl.acm.org/citation.cfm?id=312647>;pp. 42-49.*

Teufel, Moens "Summarizing Scientific Articles: Experiments with Relevance and Rhetorixal Status"; 2002 Association for Computational Linguistics; [retrieved on Apr. 16, 2013]; Retrieved from Internet <URL:http://acl.ldc.upenn.edu/J/J02/J02-4002.pdf>;pp. 409-445.*

Niwa, Nitta, "Co-Occurrence Vectors from Corpora Vs. Distance Vectors from Dictionaries"; 1994 Proceedings fo the 15$^{th}$ conference on Computational linguistics; [retrieved on Apr. 16, 2013]; Retrieved from Internet <URL:http://dl.acm.org/citation.cfm?id=991938>;pp. 304-309.*

Theobald, et al., "TopX: efficient and versatile top-k query processing for semistructured data"; 2008 VLDB Journal; [retrieved on Jul. 4, 2013]; Retrieved from Internet <URL:http://dl.acm.org/citation.cfm?id=1325148>;pp. 81-115.*

Murugesan, et al., "Efficient privacy-preserving similar document detection"; 2010 VLDB Journal; [retrieved on Jul. 4, 2013]; Retrieved from Internet <URL:http://dl.acm.org/citation.cfm?id=1842576>;pp. 457-475.*

Li Su, "Fuzzy Query Based on XML Element and Correlation", 2012 IEEE; [retrieved on Jul. 4, 2013]; Retrieved from Internet <URL:http://ieeexplore.ieee.org/stamp/stamp.jsp?tp=&arnumber=6300491>;pp. 282-285.*

Gupta, et al., "Summarizing Text by Ranking Text Units According to Shallow Linguistic Features"; 2011 ICACT; [retrieved on Jul. 4, 2013]; Retrieved from Internet <URL:http://ieeexplore.ieee.org/stamp/stamp.jsp?tp=&arnumber=5746114>;pp. 1620-1625.*

* cited by examiner

200

- Identifying at least One Subroutine from at least One Test Script, such that the Subroutine Includes at Least One Instruction Class, the Instruction Class Includes at Least an Instruction Class Type and a Subroutine Object Type, and the Test Script Includes at least One Test Script Action, and the Test Script Action Includes at least a Test Script Action Type and a Test Script Object Type — 205

- Encoding the Instruction Class as a Subroutine Vector in a Vector Space Model — 210

- Coding the Test Script Action as a Test Script Vector in the Vector Space Model — 215

- Comparing the Test Script Vector to the Subroutine Vector — 220

- Identifying the Test Script Vector as the Instruction Class if the Result of the Comparing is Above a Threshold Value — 225

- Labeling the Test Vector as a New Test Script Action if the Result of the Comparing is Below the Threshold Value — 230

- Associating a New Identifier with the New Test Script Action — 235

AUTOMATIC IDENTIFICATION OF SUBROUTINES FROM TEST SCRIPTS

RELATED APPLICATIONS

The present continuation application claims benefit of U.S. application Ser. No. 12/769,033, filed Apr. 28, 2010, which application is incorporated herein by reference in its entirety.

BACKGROUND

The present invention relates generally to the field of test scripts, and more specifically, to automatic identification of subroutines from test scripts.

Software testers record test scripts from a program under test such as a web application, and perform them on a regular basis. Recording a test script involves running the program under test, doing actions on it, and generating an instruction for each action. This may be done using standard testing tools. There is a one to one correspondence between the actions on the program, and the instructions in a test script. Recorded test scripts may need to be modified later because a certain feature of the program can be changed. In this case, the script may need to be re-recorded, although some testing tools allow editing of the scripts.

Editing of the test scripts may be manual, and quite labor intensive if a tester maintains a large number of scripts. As a result, a small change of the program may affect a large number of scripts and will require manual modification/re-recording of all those scripts. A similar problem arises when a tester decides to change/update test conditions in previously recorded test scripts. This is often the case when testers need to maintain scripts for a long period. However, this may need to be done manually for each script.

Use of subroutines can mitigate such problems. However, the tester has to define the subroutines manually after recording each test script. This may be a labor intensive process. Moreover, if a new subroutine is defined after test scripts have been created, a tester has to manually make the same change to change to each test script. For any addition or removal of subroutines, this has to be done manually, which makes the work of the tester difficult.

Hence, there is a need for a more efficient system and method for automatic identification of subroutines from test scripts.

SUMMARY

According to one embodiment of the present invention, a method comprises identifying at least one subroutine from at least one test script, wherein the subroutine includes at least one instruction class, the instruction class includes at least an instruction class type and a subroutine object type, the test script includes at least one test script action, and the test script action includes at least a test script action type and a test script object type; encoding the instruction class as a subroutine vector in a vector space model; coding the test script action as a test script vector in the vector space model; comparing the test script vector to the subroutine vector; identifying the test script vector as the instruction class if the result of the comparing is above a threshold value; labeling the test vector as a new test script action if the result of the comparing is below the threshold value; and associating a new identifier with the new test script action.

In another embodiment of the present invention, a computer program product for identifying at least one subroutine from a test script comprises a computer readable storage medium having computer readable code embodied therewith, the computer readable program code including computer readable program code that identifies at least one subroutine from at least one test script, the subroutine includes at least one instruction class, the instruction class includes at least a instruction class type and a subroutine object type, the test script includes at least one test script action, and the test script action includes at least a test script action type and a test script object type; computer readable program code that encodes the instruction class as a subroutine vector in a vector space model; computer readable program code that codes the test script the test script action as a test script vector in the vector space model by determining if the subroutine vector has repeated subsequences; setting the test script vector equal to the test script action for a subroutine vector without repeated subsequences; dividing the text script action into three parts, a prefix, middle part, and suffix, such that the middle part is a repeated subsequence, for a subroutine vector with a repeated subsequence; and computer readable program code that associates a new identifier with the test script action.

In another embodiment of the invention, a system comprises a computer including a computer processor for identifying subroutines from test scripts; a subroutine identification engine for processing the identifying of the subroutines from the test scripts, the identifying comprising: collecting a number of instances of a plurality of subroutines from test scripts; labeling the plurality of subroutines; creating subroutine vectors from the subroutines; training vector space models by weighting each term of action vectors in the vector space models; using trained models of subroutines to automatically determine the subroutines from the test scripts; determining if a sequence of actions in one of the test scripts is a learned subroutine by constructing a vector from each action in the sequence of actions; computing a cosine similarity for each of the action vectors; determining one of the action vectors with a highest cosine similarity value as a second action vector where the cosine similarity is above a predetermined threshold; determining one of the action vectors with the highest cosine similarity value as a third action vector where the cosine similarity is below a predetermined threshold; constructing a term from an identifier of the action vectors; constructing a fourth action vector containing the term; computing the similarity of the fourth action vector containing the term with each of the subroutine vectors; returning the subroutine with a highest similarity value; and a computer display for displaying the subroutine with the highest similarity value.

The above and below advantages and features are of representative embodiments only, and are not exhaustive and/or exclusive. They are presented only to assist in understanding the invention. It should be understood that they that they are not representative of all the inventions defined by the claims, and are not to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims. These and other features, aspects and advantages of the present invention will become better understood with reference to the following drawings, description and claims.

BRIEF DESCRIPTION OF THE DRAWINGS

FIG. 2 is a flowchart of an exemplary embodiment of the invention;

FIG. 10 shows instructions from a subroutine for the embodiment shown in FIG. 4, for selecting an internet link;

DETAILED DESCRIPTION

Figure 1:
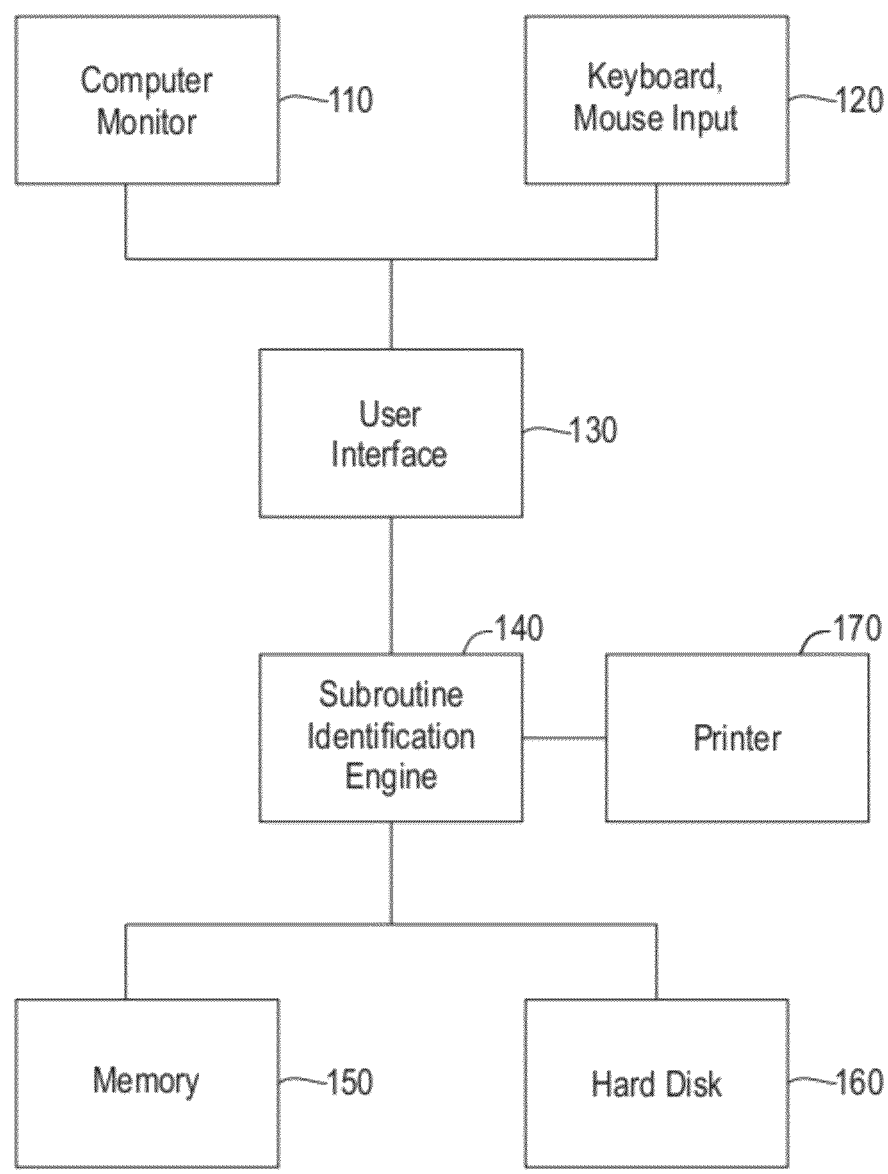
FIG. 1 is a block diagram of a system according to one exemplary embodiment of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention describes a method for automatic identification of subroutines from test scripts.

The present invention may automatically detect subroutines from test scripts by comparing vector representation of a subroutine with the vector representation of actions within a test script to identify a subroutine based on the similarity derived from the comparison. Automatic detection of subroutines may reduce test script editing and maintenance costs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

FIG. 1 is a block diagram of a system 100 according to an exemplary embodiment of the invention. The system 100 may include a computer monitor 110, a keyboard and mouse 120, a user interface 130, subroutine identification engine 140, memory 150, a hard disk 160, and a printer 170.

The user may utilize the invention by using the user interface 130 displayed on the computer monitor 110 and operating the user interface 130 with the keyboard and mouse 120. The user may utilize the system 100 by inputting data and functions from the user interface 130 for processing by the subroutine identification engine 140. The subroutine identification engine may be processed by a computer with a computer processor. The user interface 130 and the subroutine identification engine 140 may be stored in computer random random access memory 150 and on a hard disk 160. The user may also print operations from the user interface 130 on the printer 170.

An exemplary embodiment may include automatic identification of subroutines from test scripts as shown in FIG. 2.

As shown in FIG. 2, automatic identification of subroutines from test scripts 200 may include a step 205 of identifying at least one subroutine from at least one test script, such that the subroutine includes at least one instruction class, wherein the instruction class includes at least a instruction class type and a subroutine object type, and the test script includes at least one test script action, and the test script action includes at least a test script action type and a test script object type. A step 210 may include encoding the instruction class as a subroutine vector in a vector space model (VSM). A step 215 may include coding the test script action as a test script vector in the vector space model. A step 220 may include comparing the test script vector to the subroutine vector. A step 225 may include identifying the test script vector as the instruction class if the result of the comparing is above a threshold value. A step 230 may include labeling the test vector as a new test script action if the result of the comparing is below the threshold value. A step 235 may include associating a new identifier with the new test script action.

In other possible embodiments, the encoding may include making the instruction class type and the subroutine object type terms of the subroutine vector. The encoding may include making the test script action type and the test script object type terms of the test script vector. The comparing may include computing a cosine similarity between the test script vector and the subroutine vector. The labeling may include constructing a term from the new identifier and constructing a new test script vector containing the term. The similarity between the new test script action and the subroutine vector may be determined, and the new test script vector may be identified as the instruction class if the result of the comparing is above a threshold value.

Figure 3:
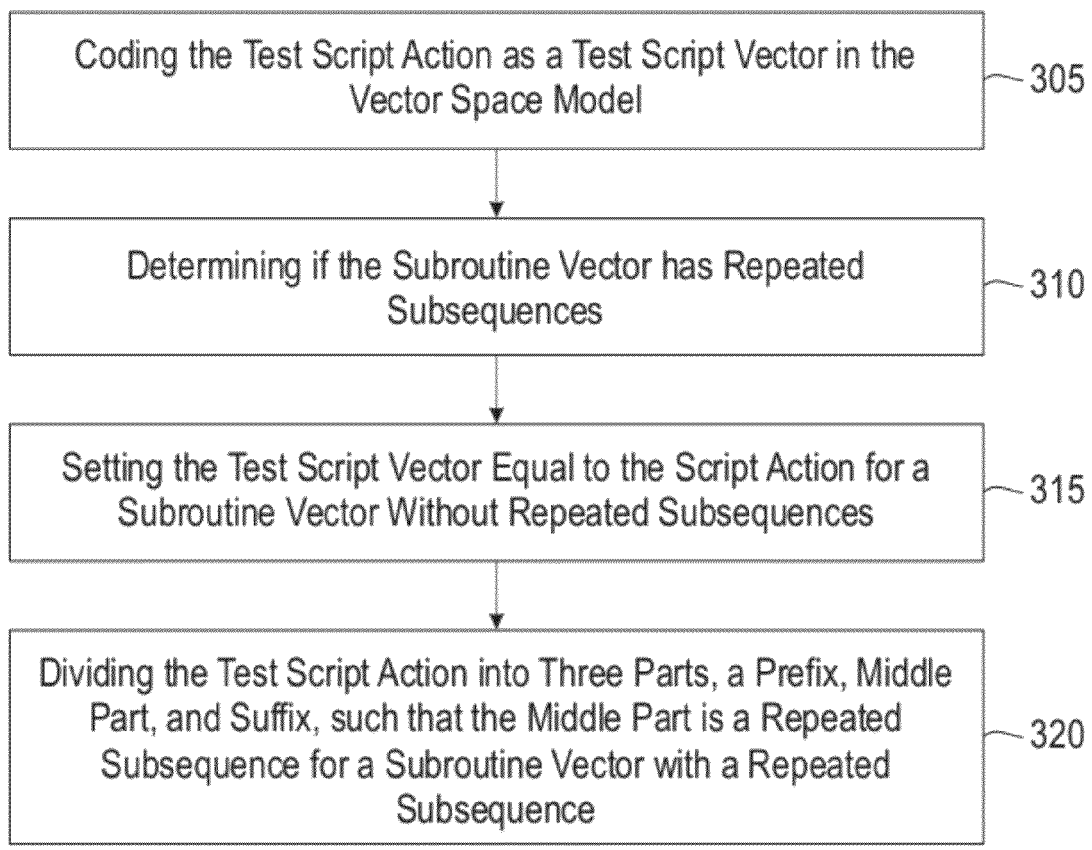
FIG. 3 is a flowchart of coding a test script action in an exemplary embodiment of the invention.

Exemplary processing in the system 100 of FIG. 1 may be described with reference to FIG. 3. FIG. 3 is an exemplary embodiment of the invention of FIG. 2 showing a method 300 of coding the test script action as a test script vector in the vector space model.

As shown in FIG. 3, coding the test script action 300 as a test script vector in the vector space model 305 may include a step 310 of determining if the subroutine vector has repeated subsequences. A step 315 may include setting the test script vector equal to the test script action for a subroutine vector without repeated subsequences. A step 320 may include dividing the test script action into three parts: a prefix, middle part, and suffix, such that the middle part is a repeated subsequence for a subroutine vector with a repeated subsequence.

In other possible embodiments, the terms of the subroutine vector are regular expressions. A sequence derived from discarding the repeated subsequences may complete the subroutine. A sequence derived from adding additional repeated sequences may complete the subroutine.

Figure 4:
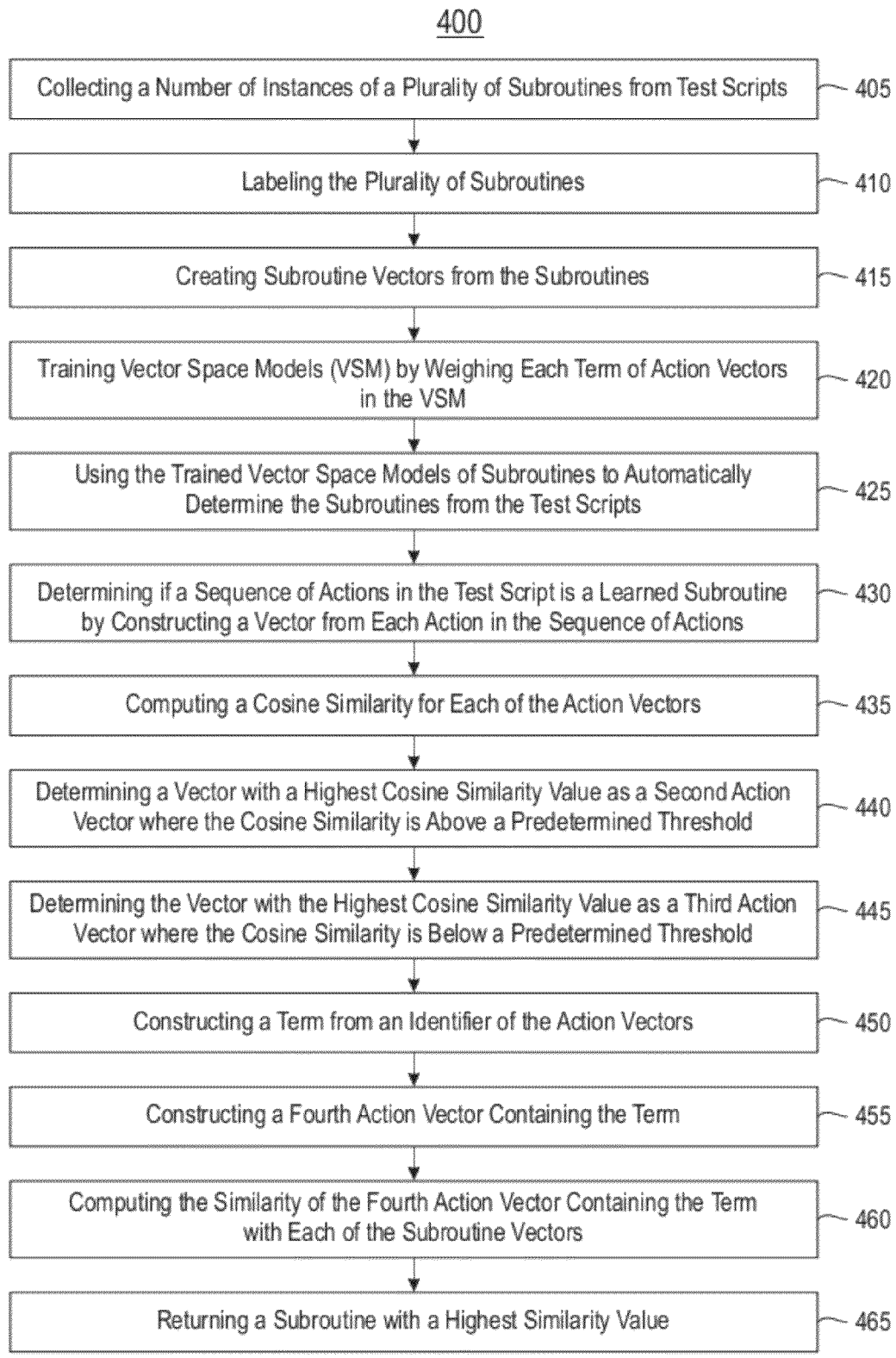
FIG. 4 is an exemplary embodiment of the invention with training of vector space models.

Exemplary processing in the system 100 of FIG. 1 may be described with reference to FIG. 4. FIG. 4 is an exemplary embodiment of the invention of FIG. 2 showing a method 400 including training vector space models.

As shown in FIG. 4, a step 405 may include collecting a number of instances of a plurality of subroutines from test scripts. A step 410 may include labeling the plurality of subroutines. A step 415 may include creating subroutine vectors from the subroutines. A step 420 may include training vector space models (VSM) by weighting each term of action vectors in the VSM. A step 425 may include using the trained vector space models of subroutines to automatically determine the subroutines from the test scripts. A step 430 may include determining if a sequence of actions in a test script is a learned subroutine by constructing a vector from each action in the sequence of actions. A step 435 may include computing a cosine similarity for each of the action vectors. A step 440 may include determining a vector with a highest cosine cosine similarity value as a second action vector where the cosine similarity is above a predetermined threshold. A step 445 may include determining the vector with the highest cosine similarity value as a third action vector where the cosine similarity is below a predetermined threshold. A step 450 may include constructing a term from an identifier of the action vectors. A step 455 may include constructing a fourth action vector containing the term. A step 460 may include computing the similarity of the fourth action vector containing the term with each of the subroutine vectors. A step 465 may include returning a subroutine with a highest similarity value. The subroutine with a highest similarity value may be output with a computer display.

In other embodiments, the test script may be segmented into a plurality of subroutines by generating consecutive subsequences of instructions, and determining if each of the consecutive subsequences is one of the plurality of subroutines. The term of the fourth action vector may be compared with terms of the subroutine vectors. Each of the subroutine vectors may be a regular expression. A routine with a highest similarity value may be returned if the similarity value is above a predetermined threshold. The predetermined threshold may be determined experimentally. The training of the vector space models may be done in a periodical fashion. Bootstrapping may be used such that a small number of training examples may be used initially, and the number of training examples may be incrementally increased as more instances of a subroutine are found. The training of the models may be done by a group of testers. A lack of subroutines may be identified may result in a case tester manually editing a test script.

Figure 5:
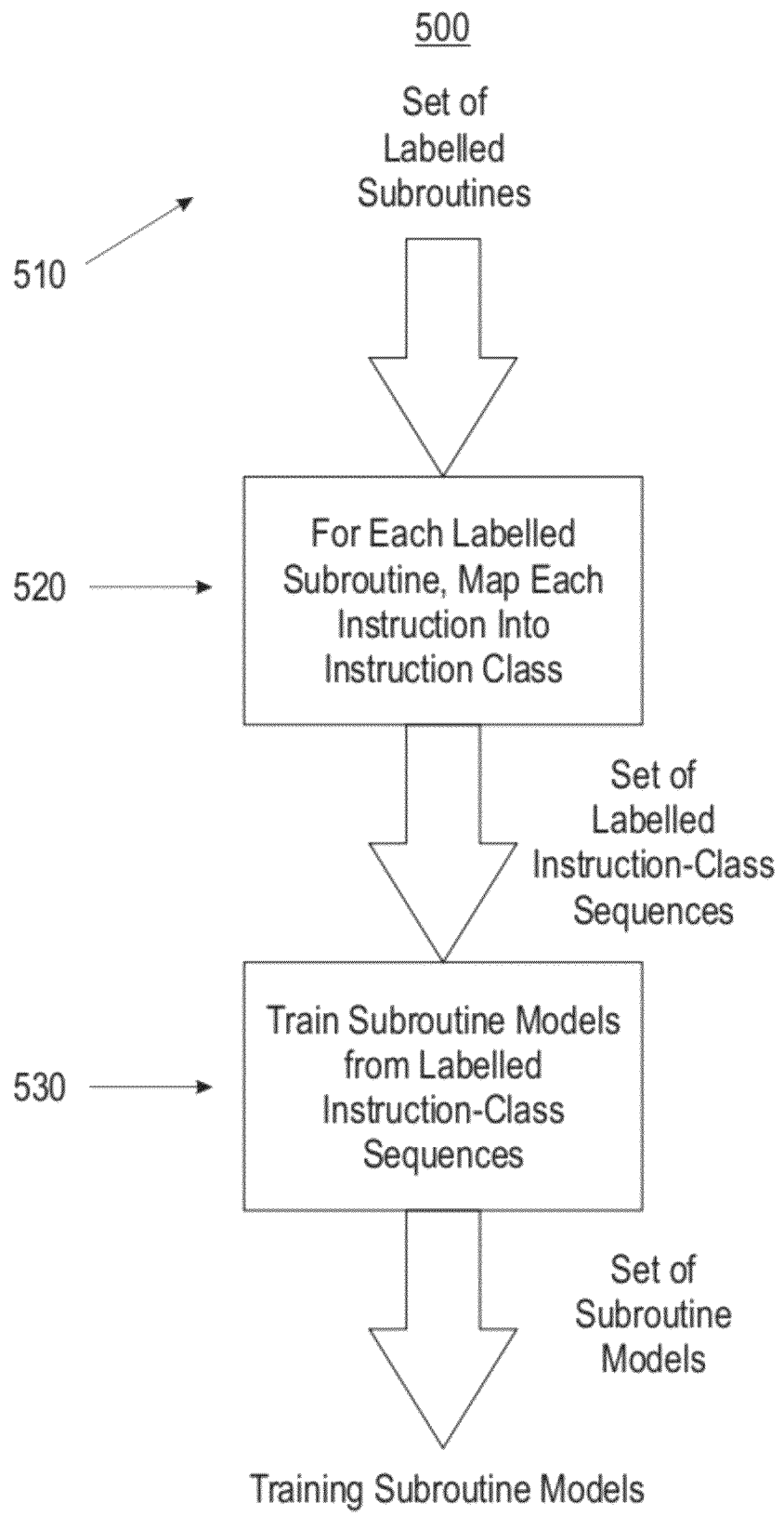
FIG. 5 is flowchart of training subroutine models for the embodiment shown in FIG. 4.

FIG. 5 is flowchart of training subroutine models 500 for the embodiment shown in FIG. 4. For each set of labeled subroutines 510, each instruction may be mapped 520 into an instruction class, resulting in labeled instruction class sequences. Subroutine models may be trained 530 from the labelled instruction class sequences.

Figure 6:
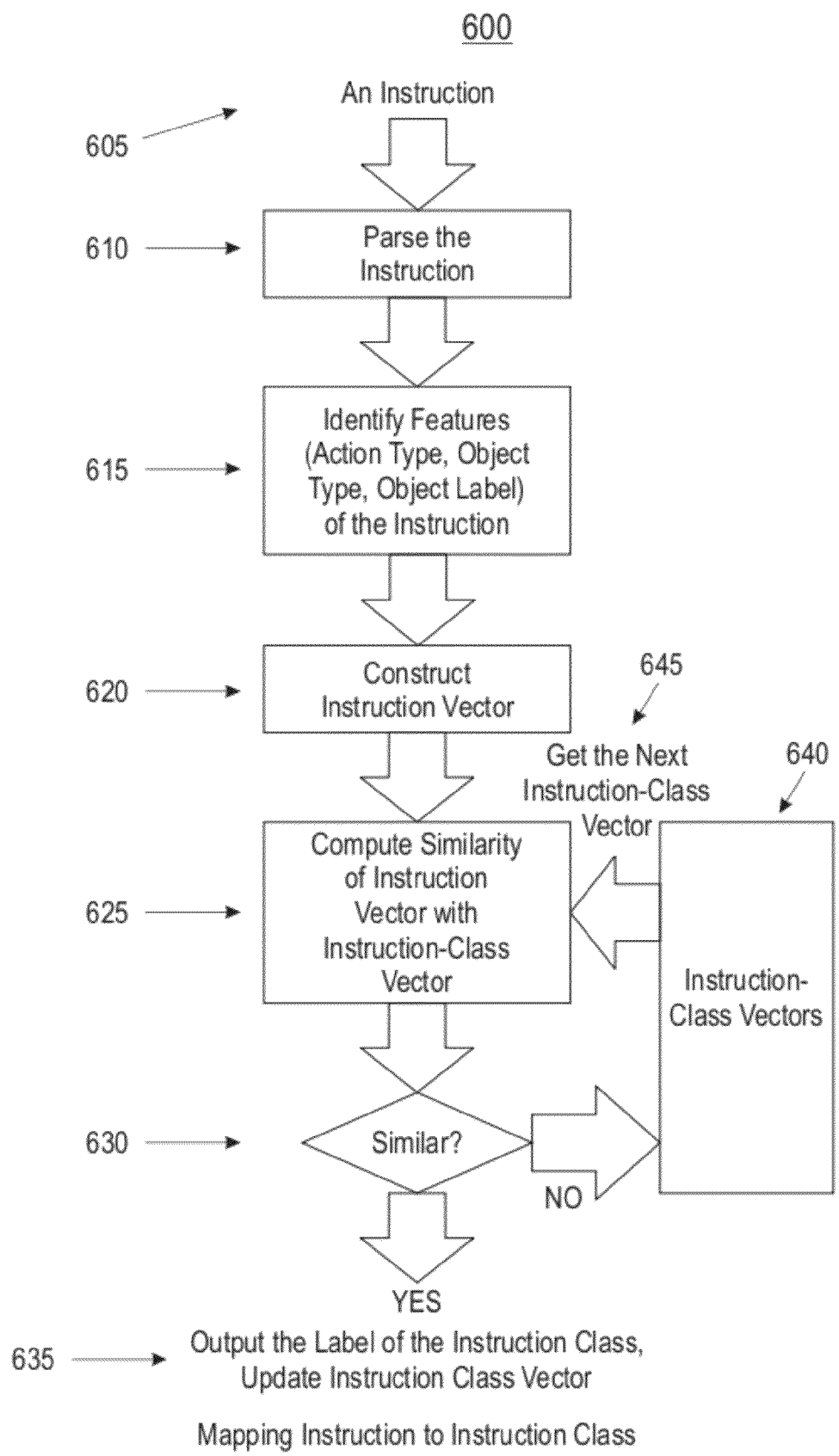
FIG. 6 shows mapping of an instruction to an instruction class for the embodiment shown in FIG. 4.

FIG. 6 shows mapping 600 of an instruction to an instruction class for the embodiment shown in FIG. 4. An instruction 605 may be parsed 610. Features 615, such as action type, object type, or object label of the instruction may be identified. An instruction vector 620 may be constructed. A similarity of the instruction vector 625 with an instruction-class vector may be computed. If the similarity determination 630 is Yes, a label of the instruction class 635 may be outputted, and the instruction class vector may be updated. If the similarity determination 630 is No, the instruction class vector 640 may be set aside and a next instruction class vector 645 may be retrieved.

Figure 7:
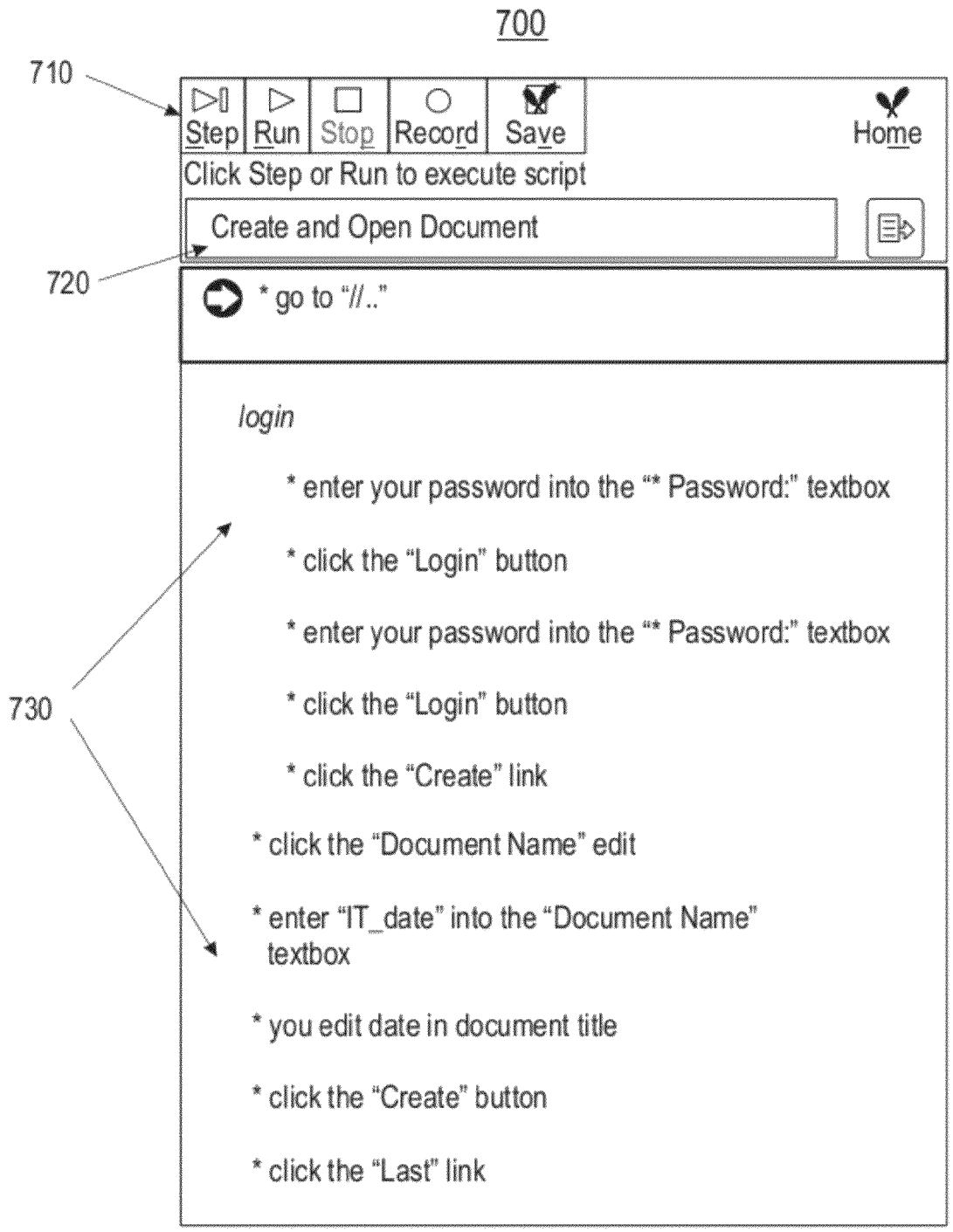
FIG. 7 shows instructions from a subroutine for the embodiment shown in FIG. 4, for creating and opening a document.
Figure 8:
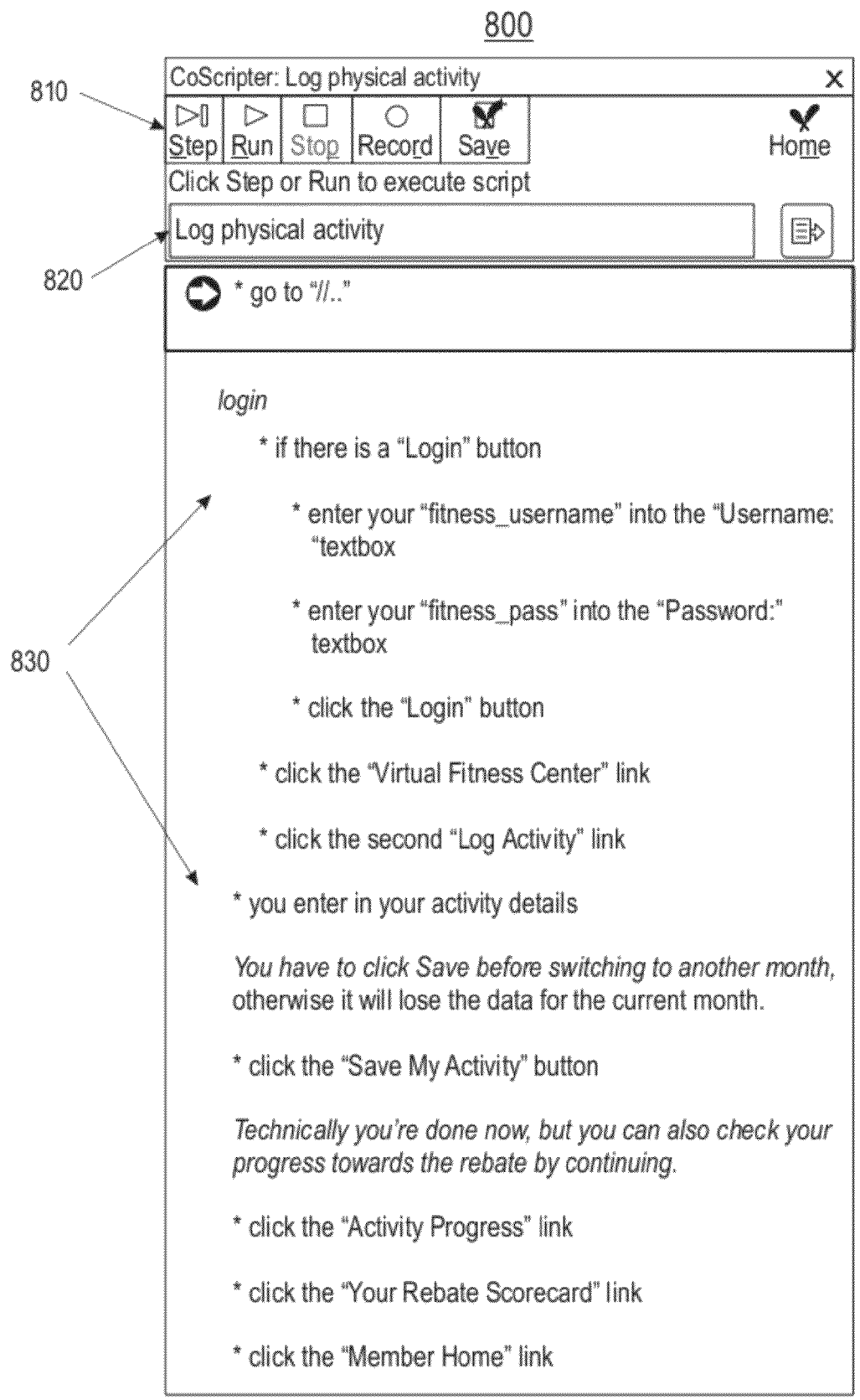
FIG. 8 shows instructions from a subroutine for the embodiment shown in FIG. 4, for logging physical activity.
Figure 9:
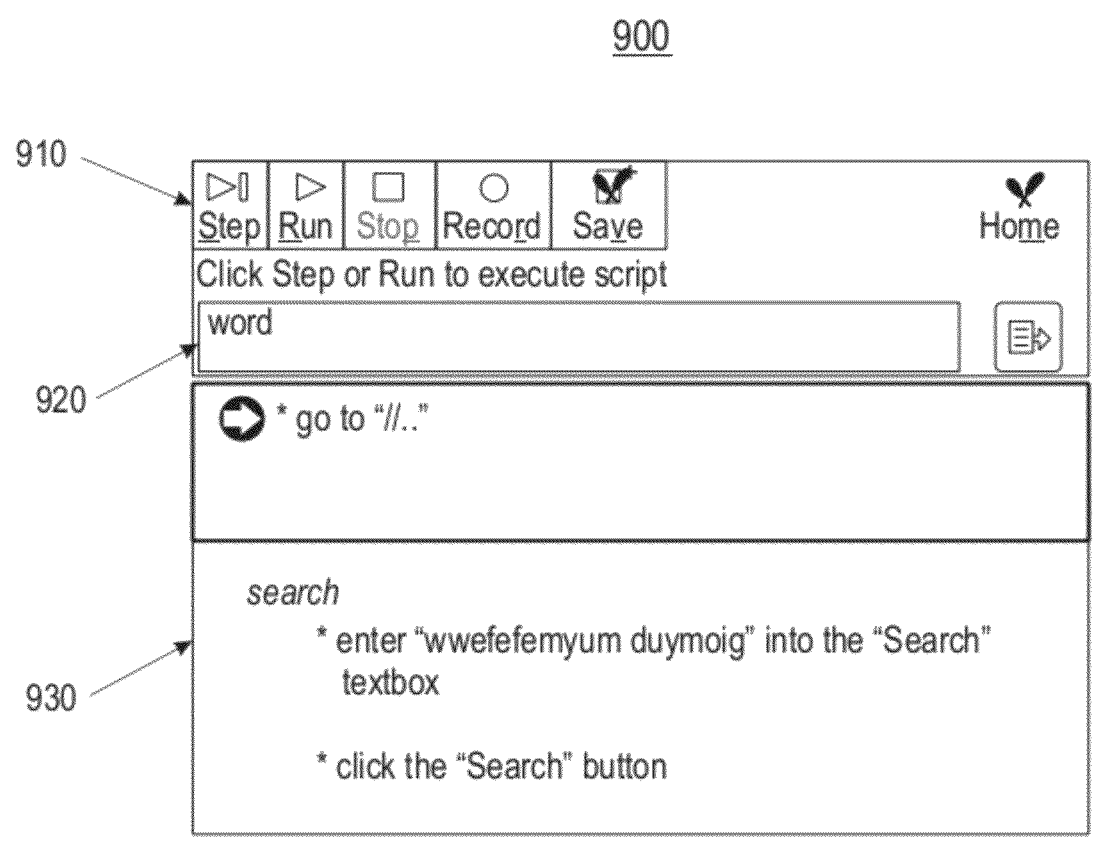
FIG. 9 shows instructions from a subroutine for the embodiment shown in FIG. 4, for performing an internet search.
Figure 10:
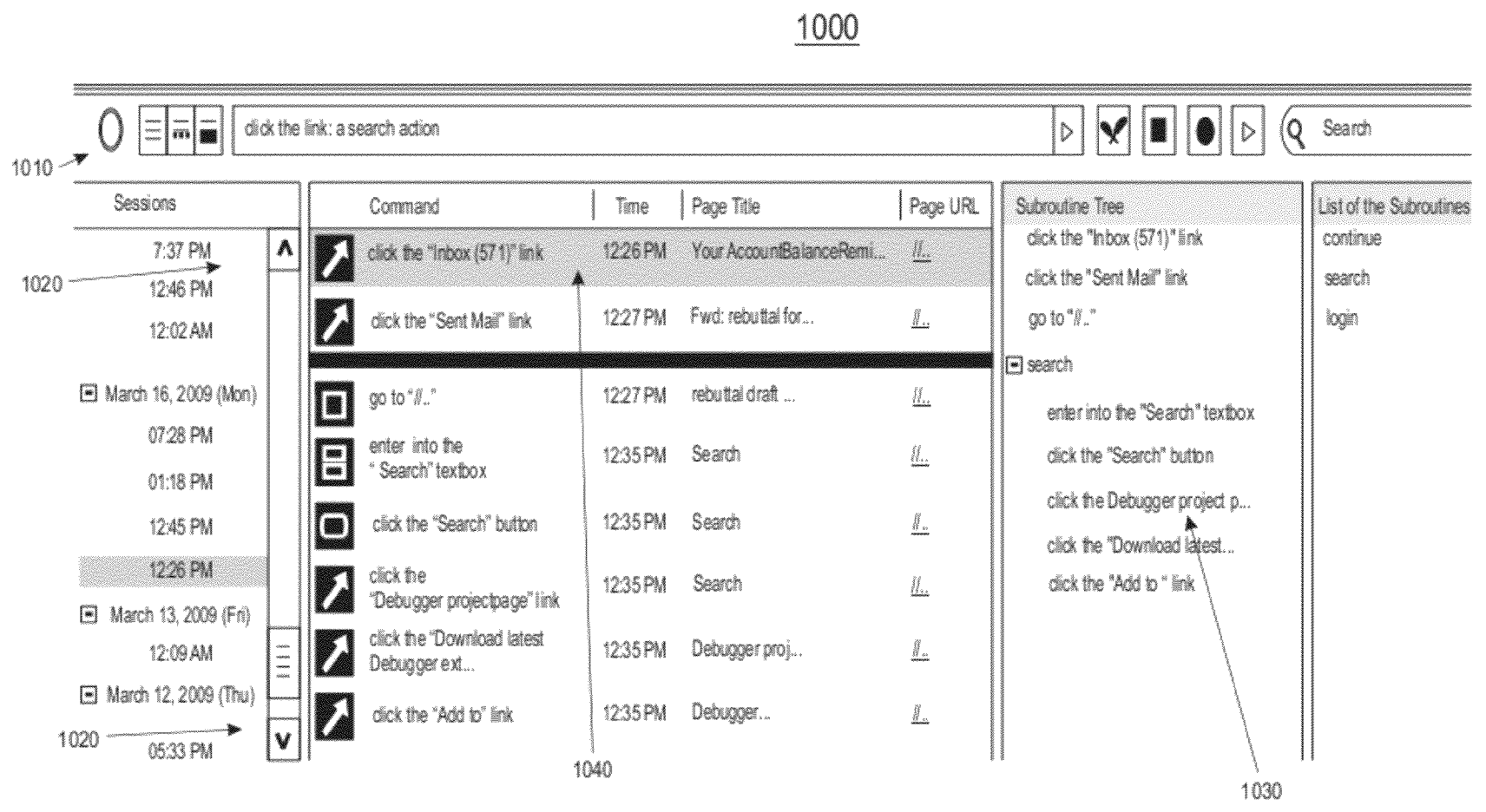
Figure 11:
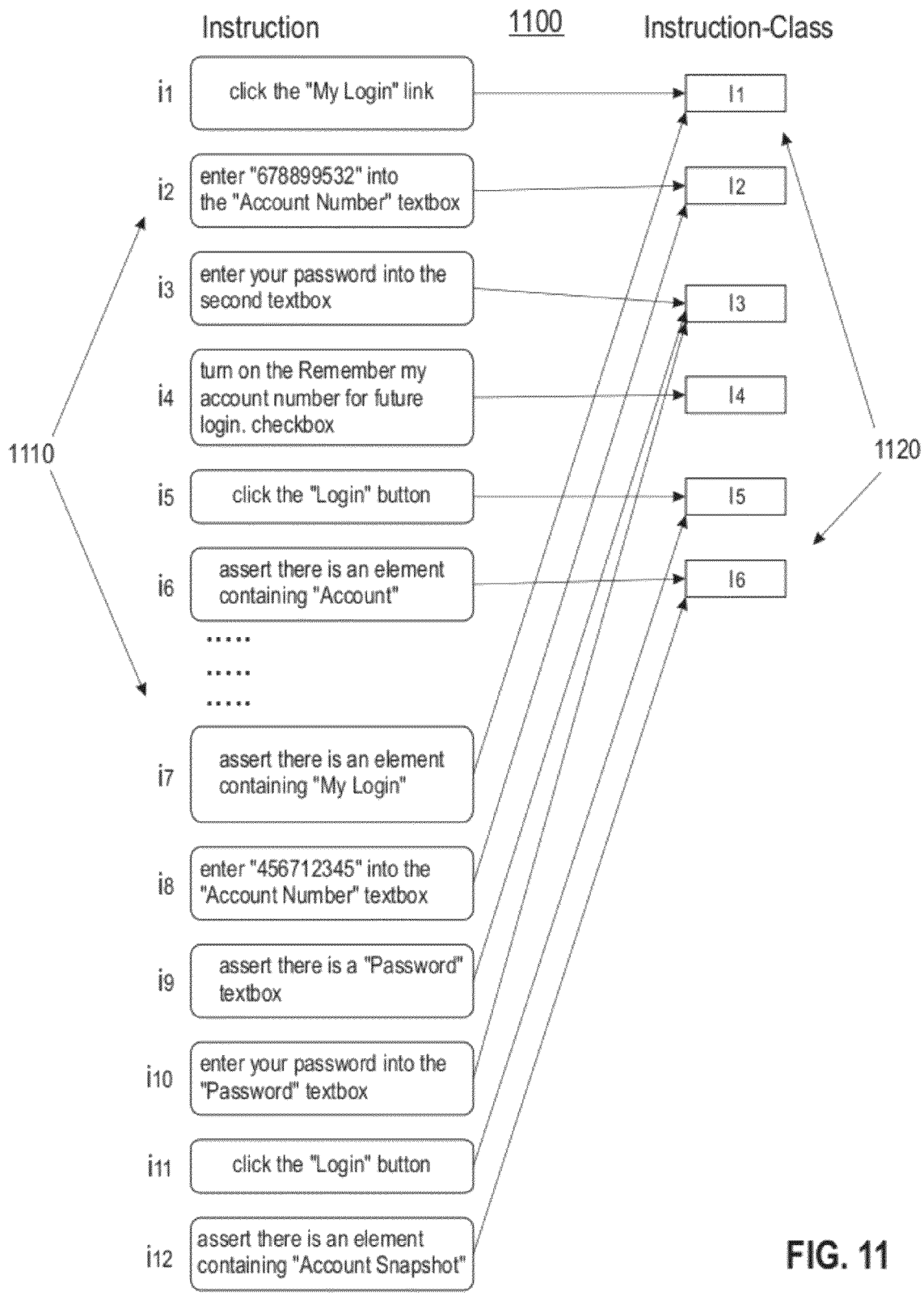
FIG. 11 shows mapping of instructions to instruction classes for the embodiment shown in FIG. 4.

FIG. 7 shows instructions 700 from a subroutine for the embodiment shown in FIG. 4, for creating and opening a document. A user interface 710 is shown that displays a test script 720. Subroutine instructions 730 are displayed. FIG. 8 shows instructions 800 from a subroutine for the embodiment shown in FIG. 4, for logging physical activity. A user interface 810 is shown displaying a test script 820. Subroutine instructions 830 are also shown. FIG. 9 shows instructions 900 from a subroutine for the embodiment shown in FIG. 4, for performing an internet search. A user interface 910 is shown displaying a test script 920. Subroutine instructions 930 are also shown. FIG. 10 shows instructions 1000 from a subroutine for the embodiment shown in FIG. 4, for selecting an internet link. A user interface 1010 is shown displaying a list of test scripts 1020. Subroutine instructions 1030 are shown for a selected test script 1040. FIG. 11 shows mapping 1100 of instructions 1110 to instruction classes 1120 for the embodiment shown in FIG. 4.

Figure 12:
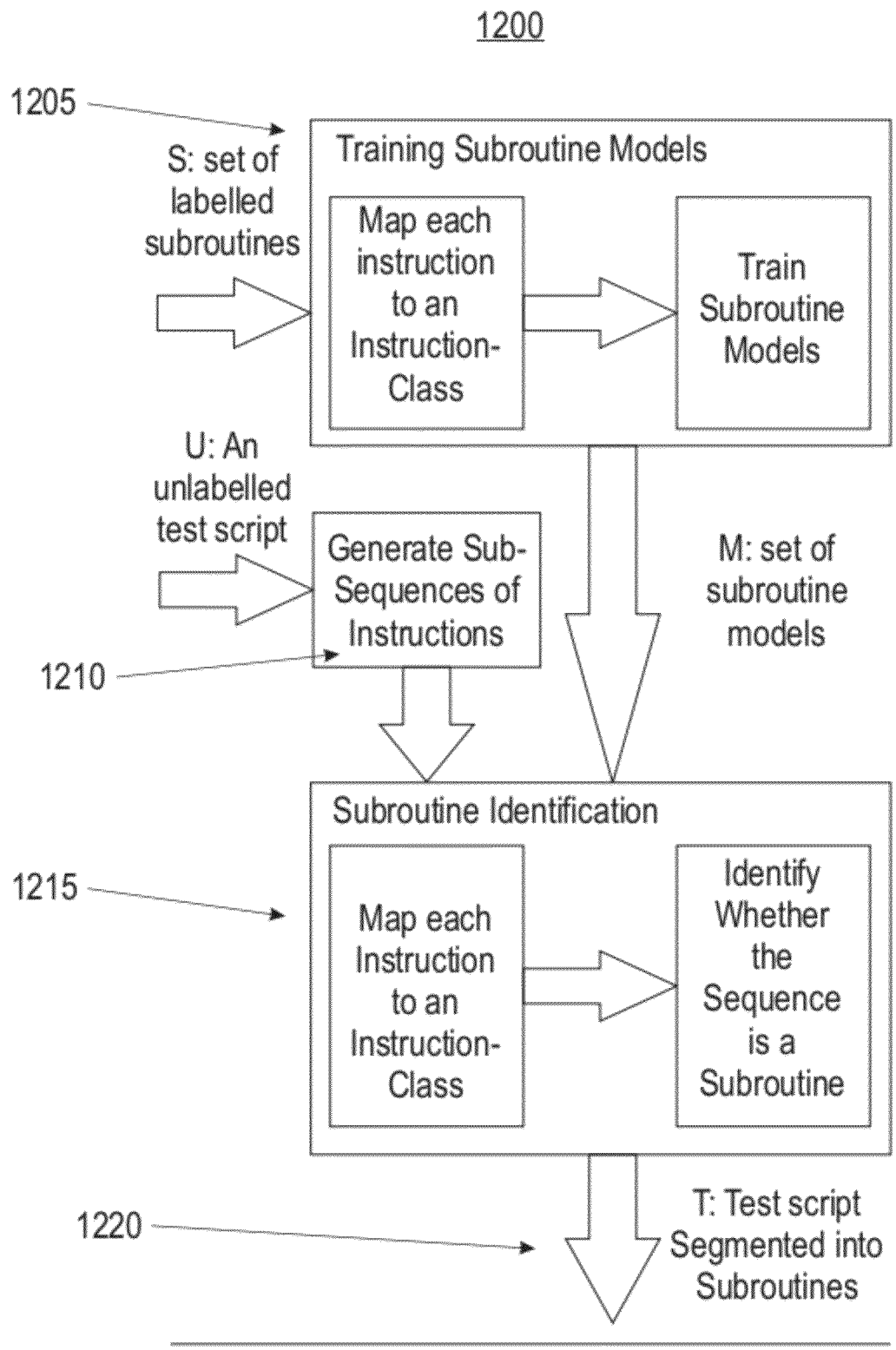
FIG. 12 shows segmentation of a test script by training of subroutine models and identifying subroutines for the embodiment shown in FIG. 4.

FIG. 12 shows segmentation 1200 of a test script by training of subroutine models 1205 and identifying 1210 subroutines for the embodiment shown in FIG. 4. A set of labeled subroutines may be trained 1205 by mapping each instruction to an instruction class. Subsequences of instructions may be generated 1210. Subroutines may be identified 1215 by mapping each instruction to an instruction class and identifying whether a sequence is a subroutine. The resulting test script may then be segmented 1220 into subroutines.

Figure 13:
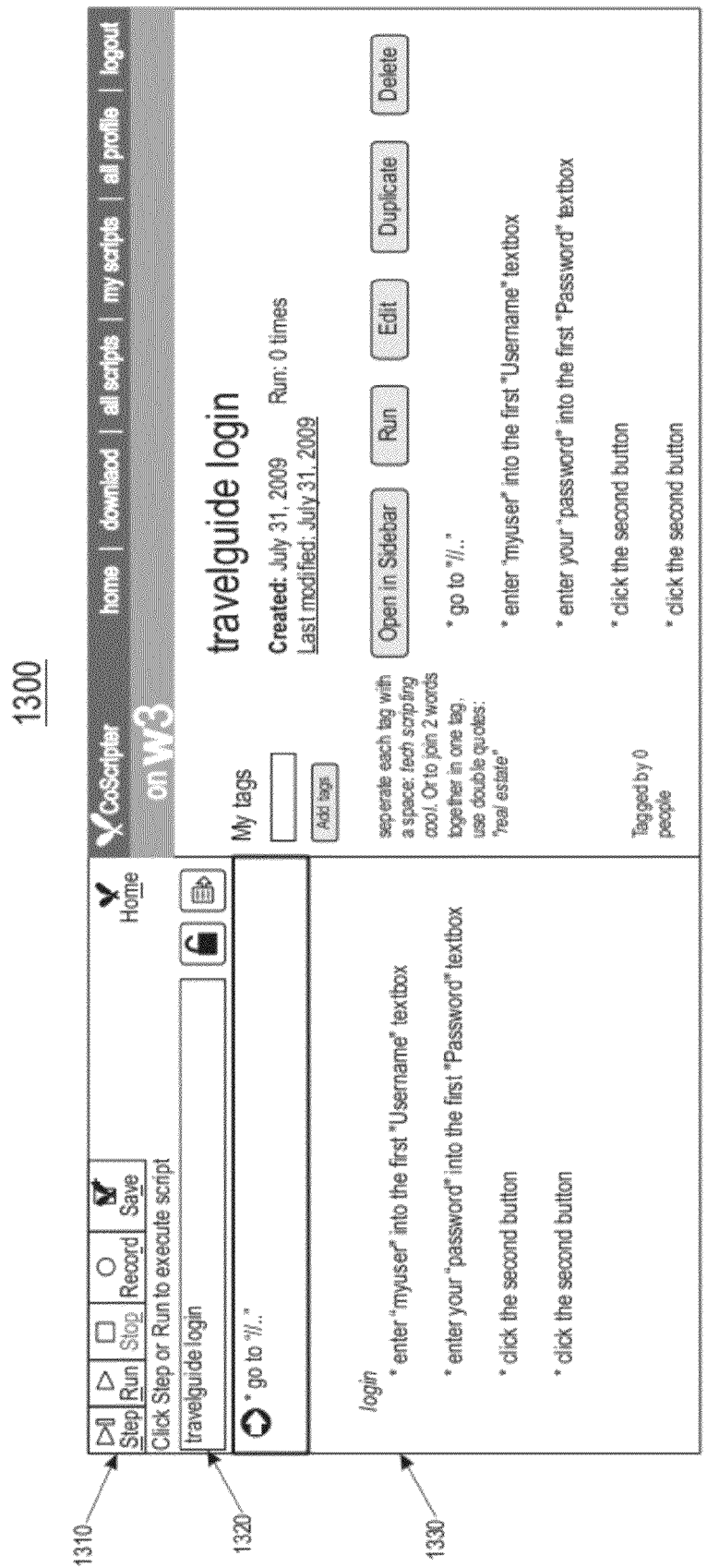
FIG. 13 shows instructions for entering a username and password for the embodiment shown in FIG. 4.
Figure 14:
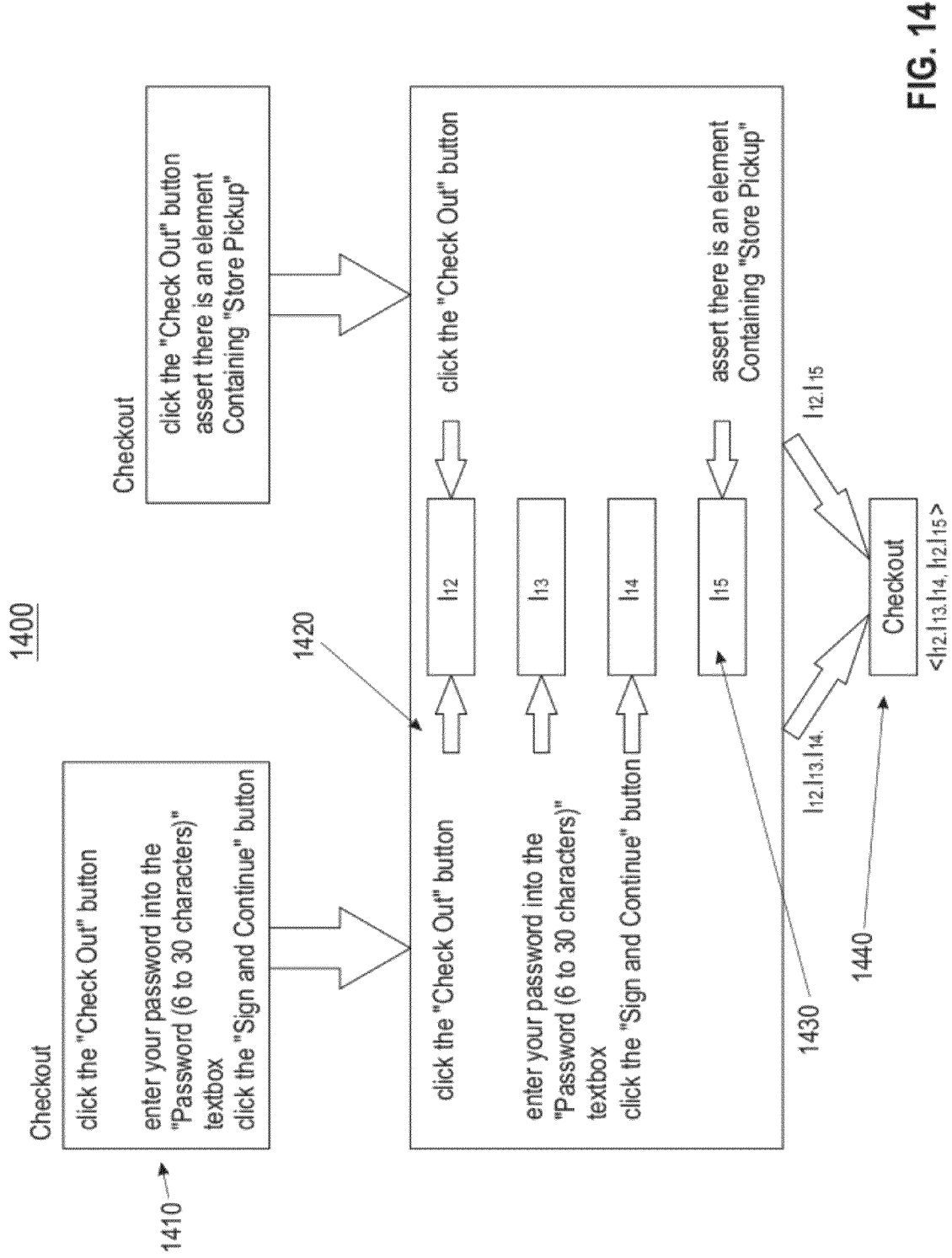
FIG. 14 shows creation of a "Checkout" subroutine vector for the embodiment shown in FIG. 4.

FIG. 13 shows instructions 1300 for entering a username and password for the embodiment shown in FIG. 4. A user interface 1310 is shown displaying a test script 1320. Subroutine instructions 1330 are also shown. FIG. 14 shows creation 1400 of a subroutine vector 1440 for the embodiment shown in FIG. 4. Instructions 1410 are mapped 1420 to instruction classes 1430. The subroutine vector 1440 is a sequence of the subroutine classes 1430.

Figure 15A:
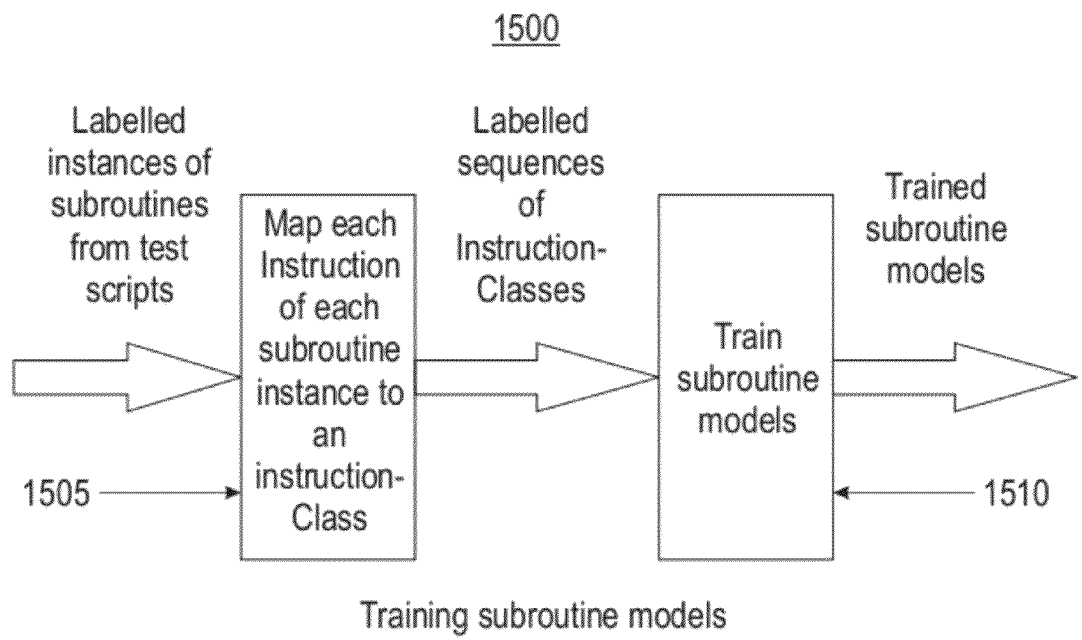
FIG. 15A shows training subroutine models for the embodiment shown in FIG. 4.
Figure 15B:
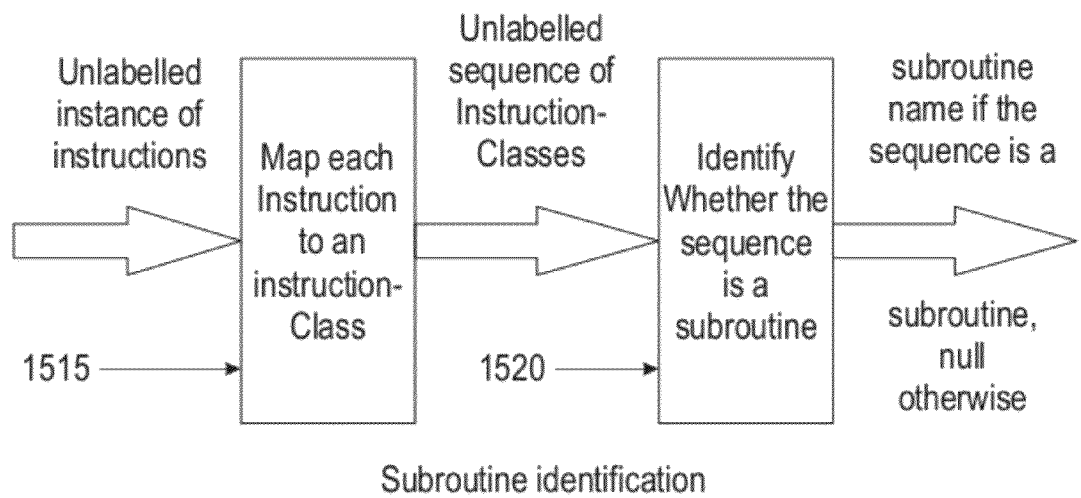
FIG. 15B shows subroutine identification for the embodiment shown in FIG. 4.
Figure 15C:
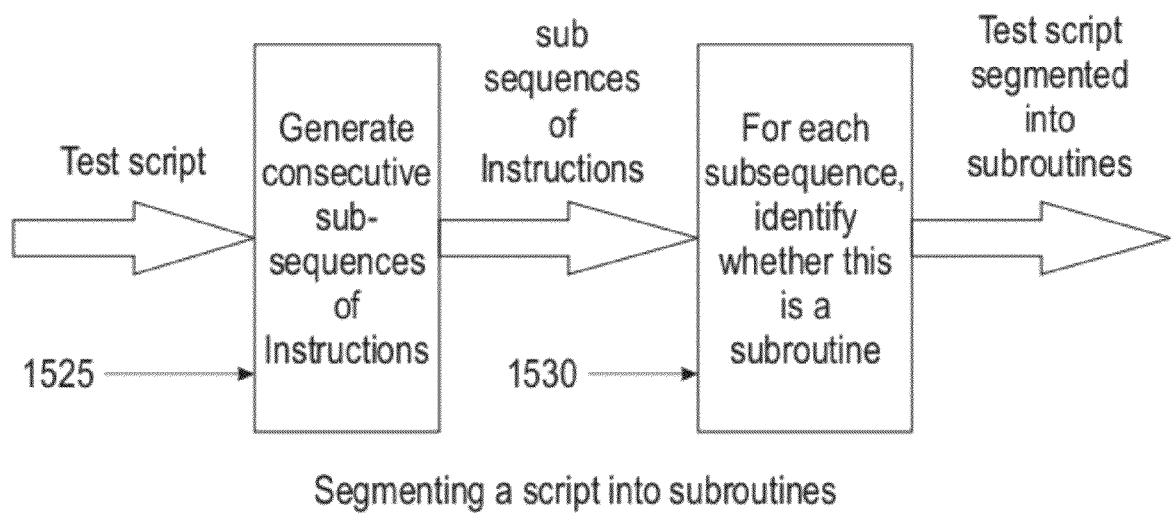
FIG. 15C shows segmenting a script into subroutines for the embodiment shown in FIG. 4.

FIG. 15 shows training subroutine models, subroutine identification, and segmenting a script into subroutines for the embodiment shown in FIG. 4 1500. Labelled instances of subroutines for test scripts may be mapped 1505 for each instruction of a subroutine to an instruction class. The labeled instances of instruction classes may be used to train 1510 subroutine models. Unlabelled sequences of instructions may be mapped 1515 for each instruction to an instruction class. The unlabelled sequences of instruction classes may be identified 1520 to determine whether the sequence is a subroutine. After generation 1525 of subsequences of instructions, each subsequence of instructions may be identified 1530 as to whether it is a subroutine.

Figure 16A:
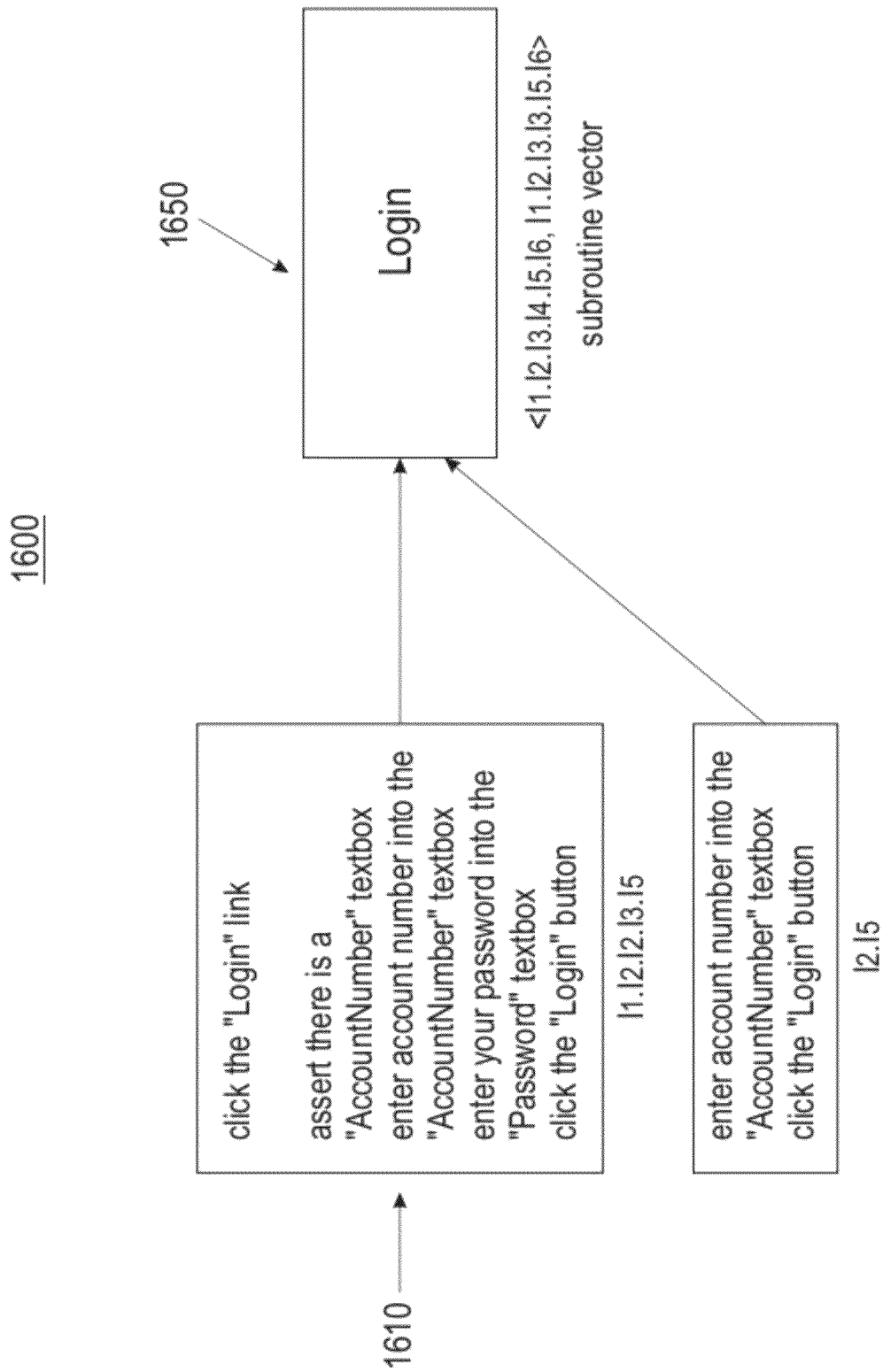
FIG. 16A shows subroutine identification for logging in for the embodiment shown in FIG. 4.
Figure 16B:
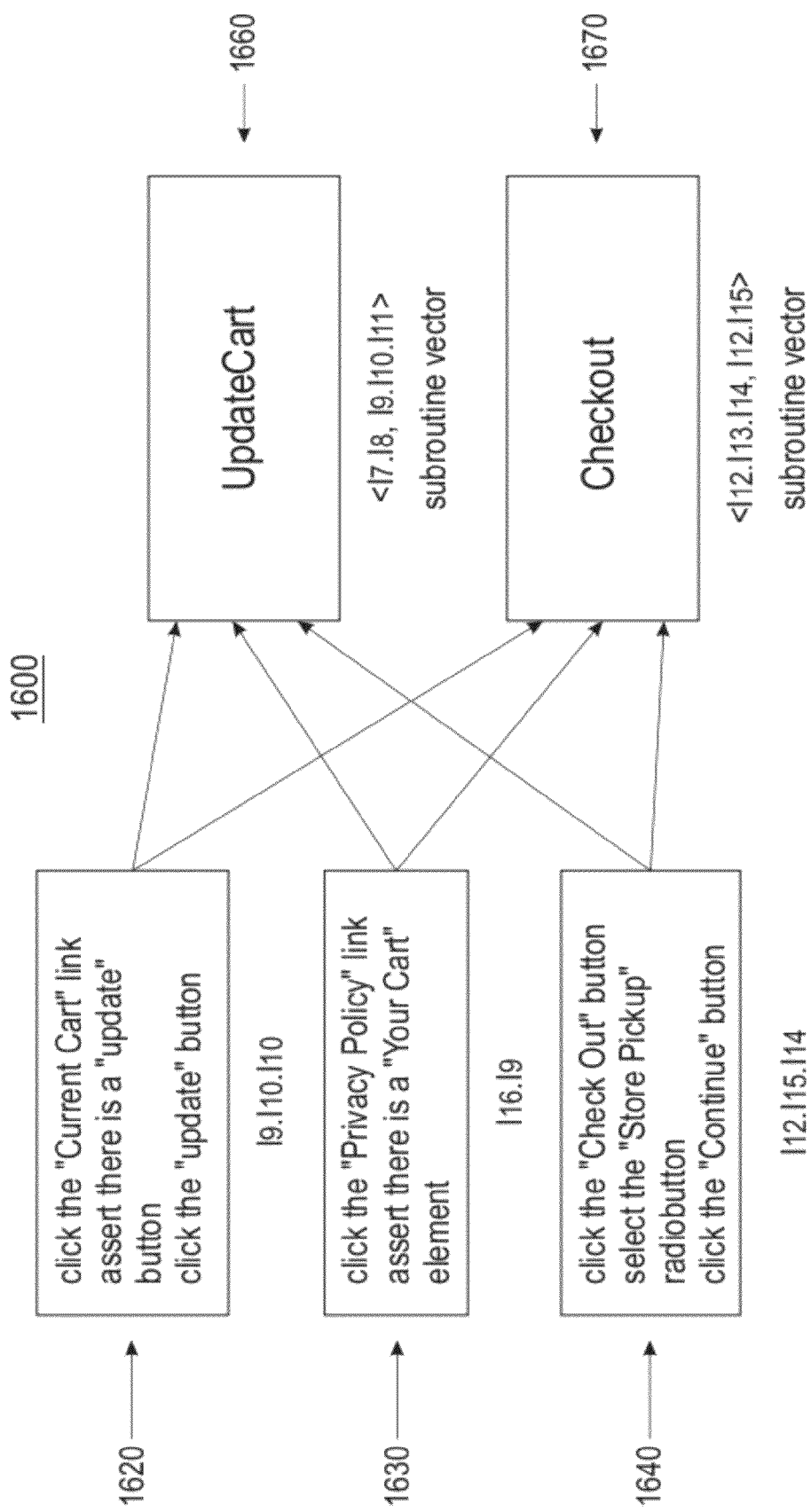
FIG. 16B shows subroutine identification for updating a cart, and checkout for the embodiment shown in FIG. 4.
Figure 17:
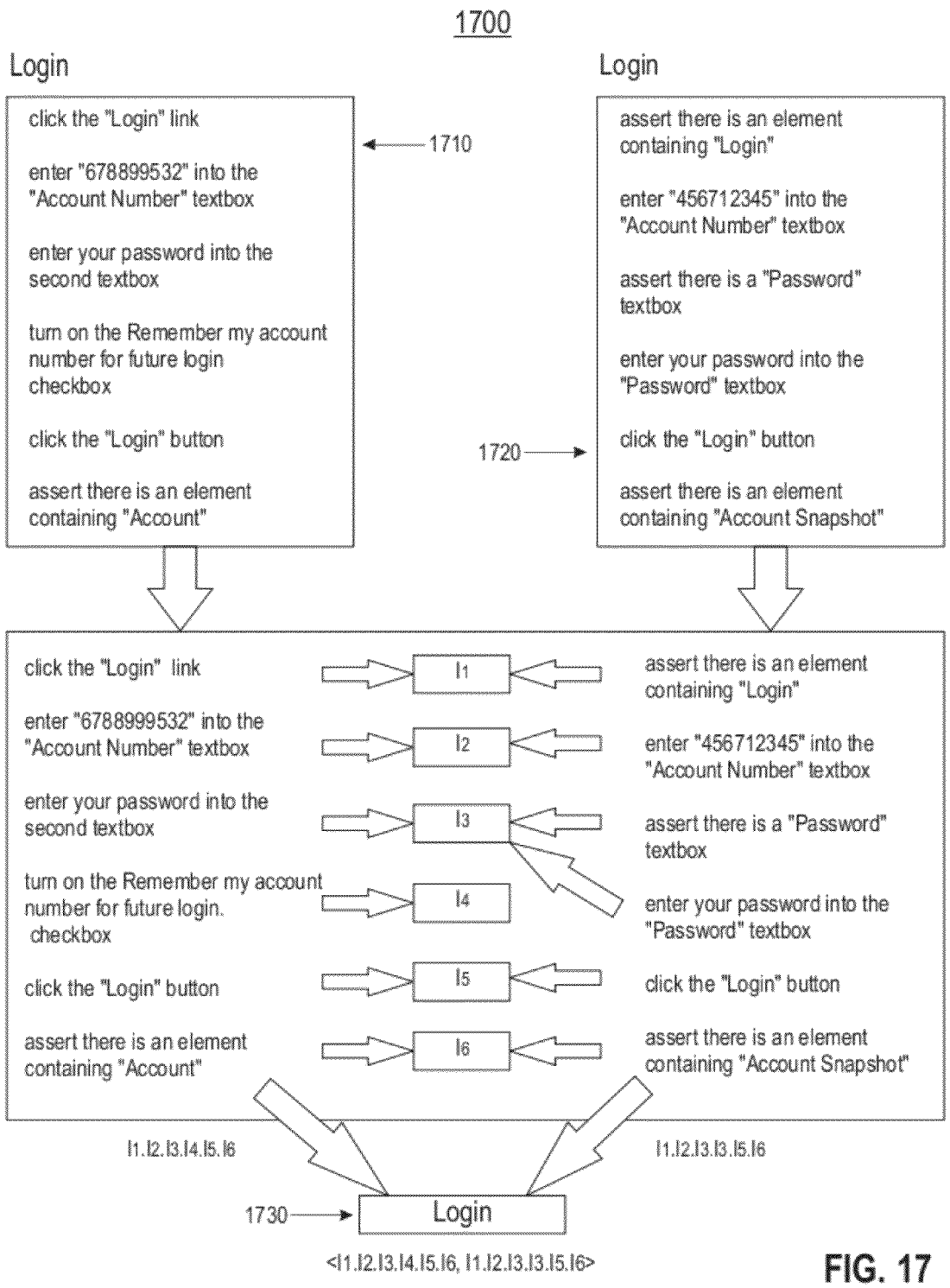
FIG. 17 shows construction of the subroutine "Login" from labeled instances of Login that may be collected from test scripts for the embodiment shown in FIG. 4.

FIG. 16 shows subroutine identification 1600 for logging in, updating a cart, and checkout for the embodiment shown in FIG. 4. As shown in FIG. 16(a), the first sequence of instructions 1610 may be identified as an instance of the "Login" 1650 subroutine. As shown in FIG. 16(b), the first sequence of instructions 1620 may be identified as an instance of the "Update Cart" 1660 subroutine, the third sequence 1640 as an instance of the "Checkout" 1670 subroutine, and the second sequence 1630 may not be identified as any of the subroutines. FIG. 17 shows construction 1700 of the subroutine Login 1730 from labeled instances of Login 1710, 1720 that may be collected from test scripts for the embodiment shown in FIG. 4.

The flowchart and block diagrams in the Figures illustrate the architecture, functionality, and operation of possible implementations of systems, methods and computer program products according to various embodiments of the present invention. In this regard, each block in the flowchart or block flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method executed by computer processor hardware comprising:
   identifying at least one subroutine from at least one test script, wherein the subroutine includes at least one instruction class, the instruction class includes at least an instruction class type and a subroutine object type, the test script includes at least one test script action, and the test script action includes at least a test script action type and a test script object type;
   encoding the instruction class as a subroutine vector in a vector space model;
   coding the test script action as a test script vector in the vector space model;
   comparing the test script vector to the subroutine vector;
   identifying the test script vector as the instruction class if the result of the comparing is above a threshold value;
   labeling the test vector as a new test script action if the result of the comparing is below the threshold value;
   associating a new identifier with the new test script action; and
   making the instruction class type and the subroutine object type terms of the subroutine vector.

2. The method of claim 1 wherein the labeling includes:
   constructing a term from the identifier; and
   constructing a new test script vector containing the term.

3. The method of claim 2 further including:
   determining similarity between the new test script action and the subroutine vector; and
   identifying the new test script vector as the instruction class if the result of the comparing is above a threshold value.

4. A method executed by computer processor hardware comprising:
   identifying at least one subroutine from at least one test script, wherein the subroutine includes at least one instruction class, the instruction class includes at least an instruction class type and a subroutine object type, the test script includes at least one test script action, and the test script action includes at least a test script action type and a test script object type;
   encoding the instruction class as a subroutine vector in a vector space model;
   coding the test script action as a test script vector in the vector space model, including making the test script action type and the test script object type terms of the test script vector;
   comparing the test script vector to the subroutine vector;
   identifying the test script vector as the instruction class if the result of the comparing is above a threshold value;
   labeling the test vector as a new test script action if the result of the comparing is below the threshold value; and
   associating a new identifier with the new test script action.

5. A method executed by computer processor hardware comprising:
   identifying at least one subroutine from at least one test script, wherein the subroutine includes at least one instruction class, the instruction class includes at least an instruction class type and a subroutine object type, the test script includes at least one test script action, and the test script action includes at least a test script action type and a test script object type;
   encoding the instruction class as a subroutine vector in a vector space model;
   coding the test script action as a test script vector in the vector space model;
   comparing the test script vector to the subroutine vector, including computing a cosine similarity between the test script vector and the subroutine vector;
   identifying the test script vector as the instruction class if the result of the comparing is above a threshold value;
   labeling the test vector as a new test script action if the result of the comparing is below the threshold value; and
   associating a new identifier with the new test script action.

* * * * *